United States Patent
Tao et al.

(10) Patent No.: US 9,600,116 B2
(45) Date of Patent: Mar. 21, 2017

(54) TOUCHSCREEN INCLUDING FORCE SENSORS

(71) Applicant: Intel Corporation, Santa Clara, CA (US)

(72) Inventors: Jiancheng Johnson Tao, Shanghai (CN); Hong W. Wong, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 244 days.

(21) Appl. No.: 13/976,797

(22) PCT Filed: Dec. 20, 2012

(86) PCT No.: PCT/CN2012/087073
§ 371 (c)(1),
(2) Date: Jun. 26, 2014

(87) PCT Pub. No.: WO2014/094283
PCT Pub. Date: Jun. 26, 2014

(65) Prior Publication Data
US 2016/0188069 A1 Jun. 30, 2016

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0414* (2013.01); *G06F 2203/04105* (2013.01)

(58) Field of Classification Search
CPC .......... G06F 3/014; G06F 3/016; G06F 3/044; G06F 2203/04105; G06F 2204/04106; G06F 3/012; G06F 2203/0381
See application file for complete search history.

(56) References Cited

U.S. PATENT DOCUMENTS

2010/0039393 A1* 2/2010 Pratt ..................... G06F 3/0236
345/173
2011/0080367 A1* 4/2011 Marchand ............ G06F 1/3215
345/174
(Continued)

FOREIGN PATENT DOCUMENTS

| CN | 101852639 A | 10/2010 |
| CN | 101989142 A | 3/2011 |

(Continued)

OTHER PUBLICATIONS

International Search Report and Written Opinion received for PCT Patent Application No. PCT/CN2012/087073, mailed on Sep. 19, 2013, 10 pages.

*Primary Examiner* — Sanjiv D Patel
(74) *Attorney, Agent, or Firm* — International IP Law Group, P.L.L.C.

(57) ABSTRACT

Computing devices and at least one machine readable medium for controlling the functioning of a touch screen are described herein. The computing device includes a touchscreen having one or more force sensors. The computing device also includes first logic to detect a force applied to the touchscreen via the one or more force sensors and second logic to control a functioning of the touchscreen in response to the applied force.

18 Claims, 4 Drawing Sheets

(56) References Cited

U.S. PATENT DOCUMENTS

| | | | |
|---|---|---|---|
| 2011/0291951 A1* | 12/2011 | Tong | G06F 3/0414 345/173 |
| 2012/0013571 A1* | 1/2012 | Yeh | G06F 3/044 345/174 |
| 2012/0056837 A1* | 3/2012 | Park | G06F 3/0414 345/173 |
| 2012/0154329 A1* | 6/2012 | Shinozaki | G06F 3/016 345/174 |
| 2012/0162122 A1* | 6/2012 | Geaghan | G06F 3/0414 345/174 |
| 2014/0098030 A1* | 4/2014 | Tang | G06F 3/0414 345/173 |

FOREIGN PATENT DOCUMENTS

| | | |
|---|---|---|
| CN | 102016780 A | 4/2011 |
| CN | 102414647 A | 4/2012 |
| CN | 102834795 A | 12/2012 |

* cited by examiner

200

300

TOUCHSCREEN INCLUDING FORCE SENSORS

TECHNICAL FIELD

One or more embodiments relate generally to a touchscreen of a computing device. More specifically, one or more embodiments relate to a touchscreen having one or more force sensors for controlling various functions of the touchscreen.

BACKGROUND ART

According to current technologies, touch sensors within a touchscreen of a computing device continuously monitor the touchscreen to determine whether an object, such as a finger of a user, has come in contact with the touchscreen. For example, in the case of capacitive touchscreens, a capacitive touch sensor continuously monitors the touchscreen to determine any changes in capacitance that may be induced by contact with an object. However, using such touch sensors to continuously monitor the touchscreen of a computing device results in the consumption of a large amount of power.

BRIEF DESCRIPTION OF THE DRAWINGS

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
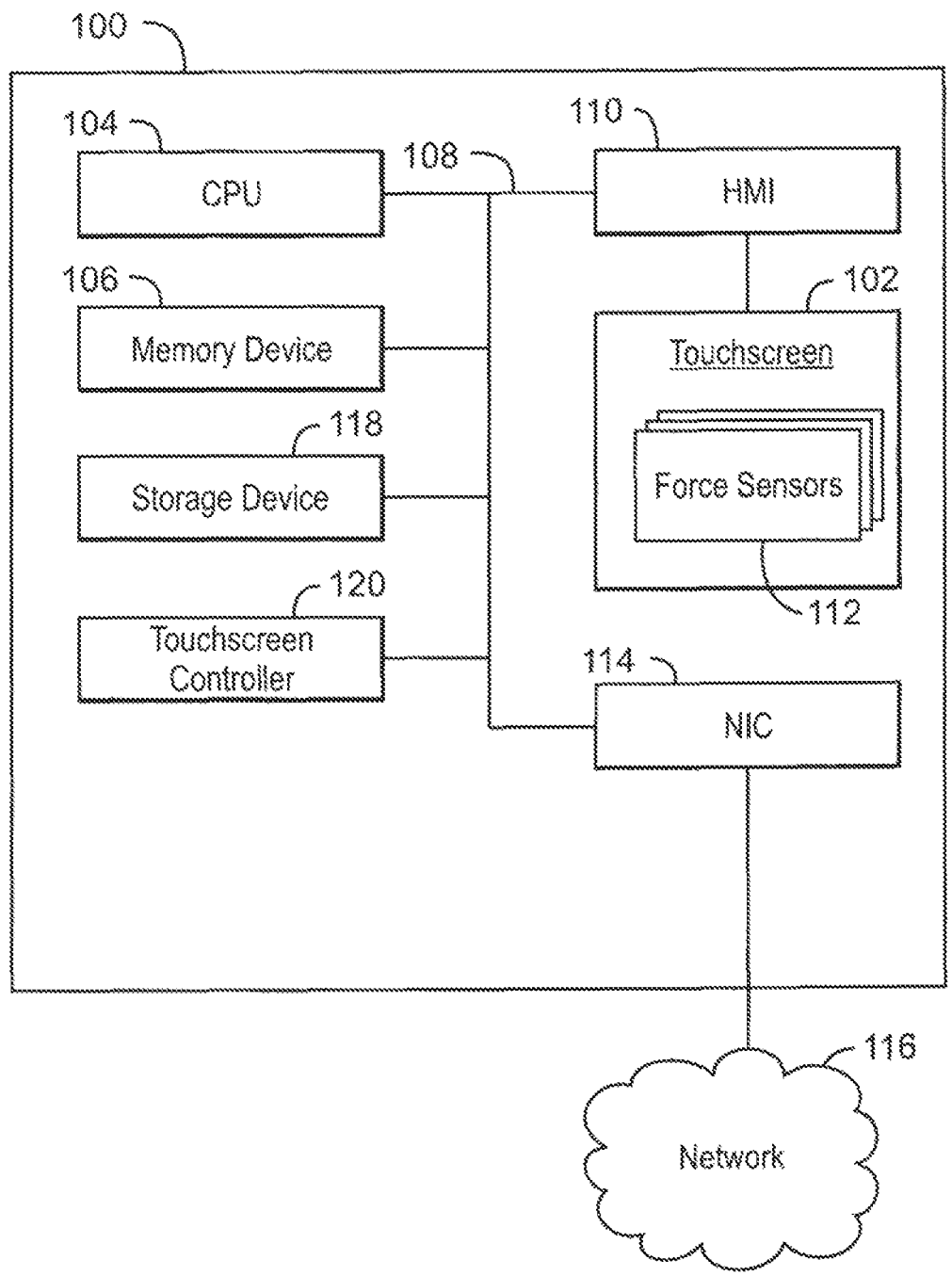
FIG. 1 is a block diagram of a computing device that may be used in accordance with embodiments.

As discussed above, using touch sensors such as capacitive touch sensors to continuously monitor the touchscreen of a computing device results in the consumption of a large amount of power. Therefore, embodiments described herein provide a touchscreen that is monitored and controlled using a number of force sensors within the touchscreen. The use of such force sensors may result in a reduction of the power consumption of the computing device because force sensors typically consume less power than capacitive touch sensors and other types of touch sensors that are used according to current technologies. In particular, the use of such force sensors may reduce the idle power consumption of the computing device by allowing the capacitive touch sensors or other touch sensors to be disabled or in low power mode while the computing device is in an idle mode.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

As used herein, the term "logic" encompasses any functionality for performing a task. For instance, each operation illustrated in the flowcharts corresponds to logic for performing that operation. An operation can be performed using, for instance, software, hardware, firmware, or any combinations thereof.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. Elements or aspects from an embodiment can be combined with elements or aspects of another embodiment.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

FIG. 1 is a block diagram of a computing device 100 that may be used in accordance with embodiments. The computing device 100 may be a mobile computing device that includes a touchscreen 102, such as a mobile phone, for example. The computing device 100 may also be any other suitable type of computing device that includes a touchscreen 102, such as an all-in-one computing system, laptop computer, desktop computer, tablet computer, or server, among others. The computing device 100 may include a central processing unit (CPU) 104 that is configured to execute stored instructions, as well as a memory device 106 that stores instructions that are executable by the CPU 104. The CPU 104 may be coupled to the memory device 106 via a bus 108. Additionally, the CPU 104 can be a single core processor, a multi-core processor, a computing cluster, or any number of other configurations. Furthermore, the computing device 100 may include more than one CPU 104. The instructions that are executed by the CPU 104 may be used to direct the functioning of the touchscreen 102 of the computing device 100.

The memory device 106 can include random access memory (RAM), read only memory (ROM), flash memory, or any other suitable memory systems. For example, the memory device 106 may include dynamic random access memory (DRAM).

The CPU 104 may be connected through the bus 108 to a human-machine interface (HMI) 110 configured to connect the computing device 100 to the touchscreen 102. According to embodiments described herein, the touchscreen 102 includes a number of force sensors 112. For example, in various embodiments, the touchscreen 102 includes four force sensors 112, wherein one force sensor 112 is positioned at each corner of the touchscreen 102. Various functions of the touchscreen 102 may be controlled based on feedback from the force sensors 112.

The computing device 100 may also include a network interface controller (NIC) 114. The NIC 114 may be configured to connect the computing device 100 through the bus 108 to a network 116. The network 116 may be a wide area network (WAN), local area network (LAN), or the Internet, among others.

The computing device 100 may also include a storage device 118. The storage device 118 may be a physical memory such as a hard drive, an optical drive, a thumbdrive, an array of drives, or any combinations thereof. The storage device 118 may also include remote storage drives.

The CPU 104 may be connected through the bus 108 to a touchscreen controller 120. In some embodiments, the touch controller 120 resides within, or is coupled to, the HMI 110. The touchscreen controller 120 may be configured to control the force sensors 112 and any other sensors within the touchscreen 102. In response to an external event, such as the computing device 100 transitioning from a sleep mode, idle mode, or standby mode to an active mode, the CPU 104 may wake up the touchscreen controller 120 and allow the touchscreen 102 to be active and capture user input on the touchscreen 102. This external event can also be triggered by the force sensors 112. For example, when the computing device 100 is in an active state, the touchscreen controller 120 may also be in an active state and may consume a large amount of power. The timer of the computing device 100 can be set such that, when no input is detected within a set interval, such as 0.5 second, the touchscreen controller 120 will go into a low power state, or power conservation mode. The computing device 100 may still be in an active state. When the force sensors 112 detect user input, they may activate the touchscreen controller 120 and allow the touchscreen controller 120 to handle the user input via the touchscreen 102. The force sensors 112 allow the touchscreen controller 120 to cycle between active and lower power state and reduce the overall power consumption of the touchscreen controller 120.

The block diagram of FIG. 1 is not intended to indicate that the computing device 100 is to, include all of the components shown in FIG. 1. Further, the computing device 100 may include any number of additional components not shown in FIG. 1, depending on the details of the specific implementation.

Figure 2:
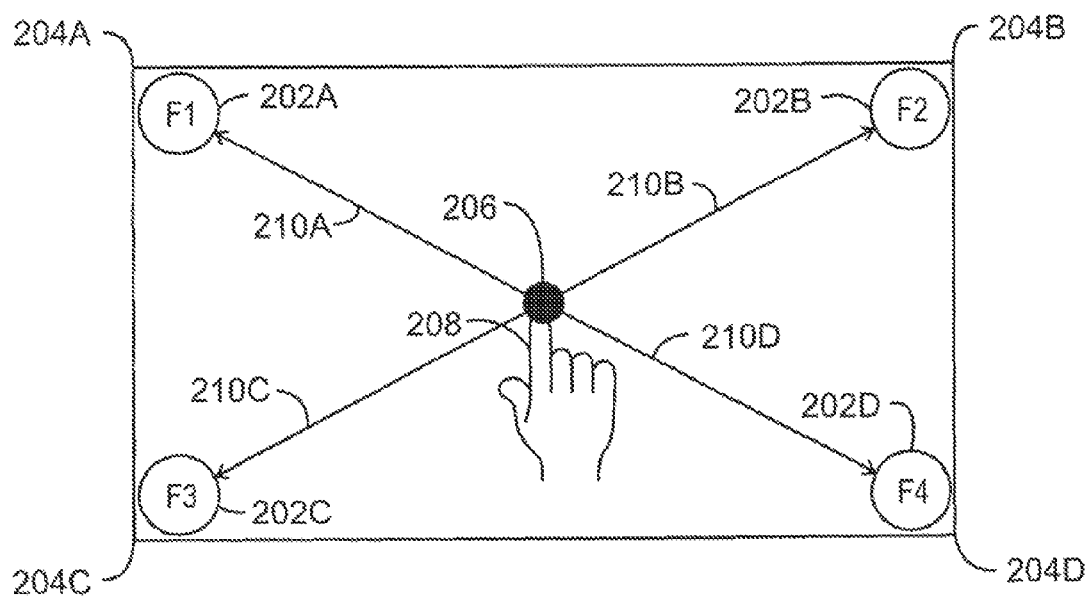
FIG. 2 is a schematic of a touchscreen including a number of force sensors, in accordance with embodiments.

FIG. 2 is a schematic of a touchscreen 200 including a number of force sensors 202A-D, in accordance with embodiments. In various embodiments, the touchscreen 200 is a capacitive touchscreen, such as a surface capacitive touchscreen, a projected mutual capacitive touchscreen, or a projected self-capacitive touchscreen. However, the touchscreen 200 may also be any other suitable type of touchscreen. Further, in various embodiments, the touchscreen 200 is implemented with a mobile computing device, such as a mobile phone, or an all-in-one computing system. However, the touchscreen 200 may also be implemented within any other suitable type of computing device.

A first force sensor 202A, i.e., "F1," may be positioned at a first corner 204A of the touchscreen 200. A second force sensor 202B, i.e., "F2," may be positioned at a second corner 204B of the touchscreen 200. A third force sensor 202C, i.e., "F3," may be positioned at a third corner 204C of the touchscreen 200. In addition, a fourth force sensor 202D, i.e., "F4," may be positioned at a fourth corner 204D of the touchscreen 200.

According to embodiments described herein, a force is applied to a point 206 on the touchscreen 200. For example, as shown in FIG. 2, a finger 208 of a user of the computing device may press on the touchscreen 200 at a specific point 206. The computing device may then determine the position of the point 206 at which the force was applied to the touchscreen 200.

In various embodiments, the force sensed by each force sensor 202A-D is different. Specifically, the amount of force sensed by each force sensor 202A-D depends on the amount of force applied to the touchscreen 200 and the position of the point 206 at which the force was applied. Thus, the differences between the amount of force sensed by each force sensor 202A-D, indicated in FIG. 2 by arrows 210A-D, respectively, may be used to determine the position of the point 206 at which the force was applied.

In addition, in various embodiments, it may be determined whether the force applied to the touchscreen 200 exceeds a specified threshold. The specified threshold may be determined by a user or developer of the computing device, for example. If the force does not exceed the threshold, then the application of the force may be considered to be unintentional and may be ignored. For example, if the touchscreen 200 comes into contact with another item within a user's pocket or purse, the computing device may determine that the application of the force was unintentional and, thus, may not alter the state of the touchscreen 200 in response to the application of the force.

If it is determined that the force applied to the touchscreen 200 exceeds the threshold, the functioning of the touchscreen 200 may be controlled based on the application of the force. In some embodiments, the orientation of the computing device is controlled based on the position of the point 206 at which the force was applied to the touchscreen 200. In addition, in some embodiments, the touchscreen 200 is activated from a deactivated state if the force applied to the touchscreen 200 exceeds the threshold. For example, the touchscreen 200 may be activated in response to the application of a continuous force that exceeds the threshold. In some cases, if the touchscreen 200 includes a lock function, the continuous force may include a sliding action along a particular region of the touchscreen 200, for example.

The schematic of FIG. 2 is not intended to indicate that the touchscreen 200 is to include all of the components shown in FIG. 2. Further, the touchscreen 200 may include any number of additional components not shown in FIG. 2, depending on the details of the specific implementation.

Figure 3:
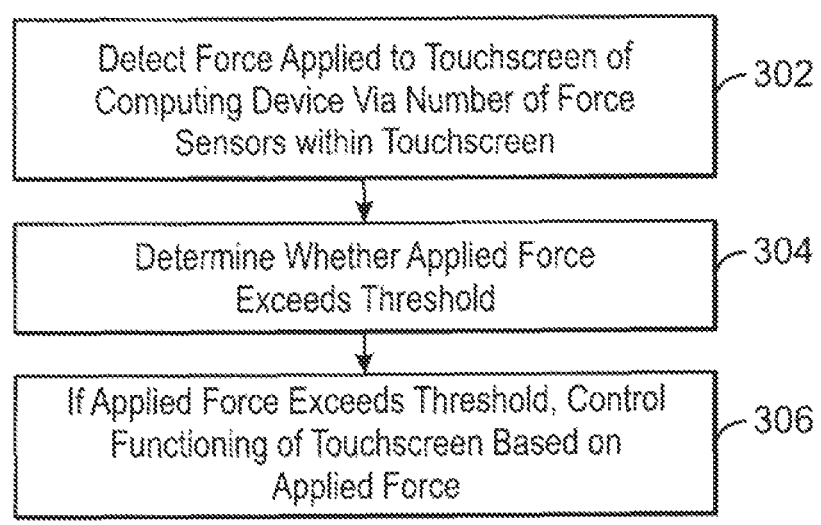
FIG. 3 is a process flow diagram showing a method for controlling the functioning of a touchscreen using a number of force sensors, in accordance with embodiments.

FIG. 3 is a process flow diagram showing a method 300 for controlling the functioning of a touchscreen using a number of force sensors, in accordance with embodiments. The method 300 is implemented by a computing device, such as the computing device 100 discussed with respect to FIG. 1. The computing device that implements the method 300 includes a touchscreen having one or more force sensors, such as the touchscreen 200 discussed with respect to FIG. 2. For example, in some embodiments, a force sensor is positioned at each corner of the touchscreen. In other embodiments, a single force sensor is positioned at the center of the touchscreen.

The method begins at block 302, at which a force applied to a touchscreen of a computing device is detected via a number of force sensors within the touchscreen. The force may be applied by a finger of the user or a stylus, for example. In various embodiments, the amount of force sensed by each force sensor varies depending on the position on the touchscreen at which the force is applied.

At block 304, it is determined whether the force applied to the touchscreen exceeds a threshold. The threshold may be specified by the user or developer of the computing device, for example.

At block 306, if the applied force exceeds the threshold, the functioning of the touchscreen is controlled based on the applied force. In some embodiments, controlling the functioning of the touchscreen includes activating the touchscreen from a deactivated or low power mode if the applied force exceeds the threshold. In some cases, the touchscreen may be activated if the applied force includes a continuous force applied to the touchscreen in a specified position.

Furthermore, the position of the applied force may be calculated based on differences between the forces sensed by each force sensor. The orientation of the touchscreen may then be controlled based on the position of the applied force.

In various embodiments, the touchscreen includes capacitive sensing capabilities. Prior to detection of the applied force, the force sensors may be enabled, and the capacitive sensing capabilities may be disabled or in the lower power mode. The capacitive sensing capabilities may only be enabled or switch to active mode if the applied force exceeds the threshold. By allowing the capacitive sensing capabilities of the touchscreen to be disabled or in low power mode until an applied force that exceeds the threshold is detected, the method 300 provides for a reduction in the power consumption of the computing device.

The process flow diagram of FIG. 3 is not intended to indicate that the blocks of method 300 are to be executed in any particular order, or that all of the blocks are to be included in every case. Further, any number of additional blocks may be included within the method 300, depending on the details of the specific implementation. For example, in various embodiments, the computing device may be used as a digital weight scale device. Specifically, the weight of an object positioned on the touchscreen may be detected via the force sensors.

It is to be understood that, although embodiments are described herein with respect to the use of a capacitive touchscreen, such embodiments may also be applied to any other suitable types of touchscreens. For example, touchscreens that operate according to technologies such as ultrasound, infrared, optic capture-camera, optical light scattering, or diffraction technologies, among others, may be used according to embodiments described herein.

Figure 4:
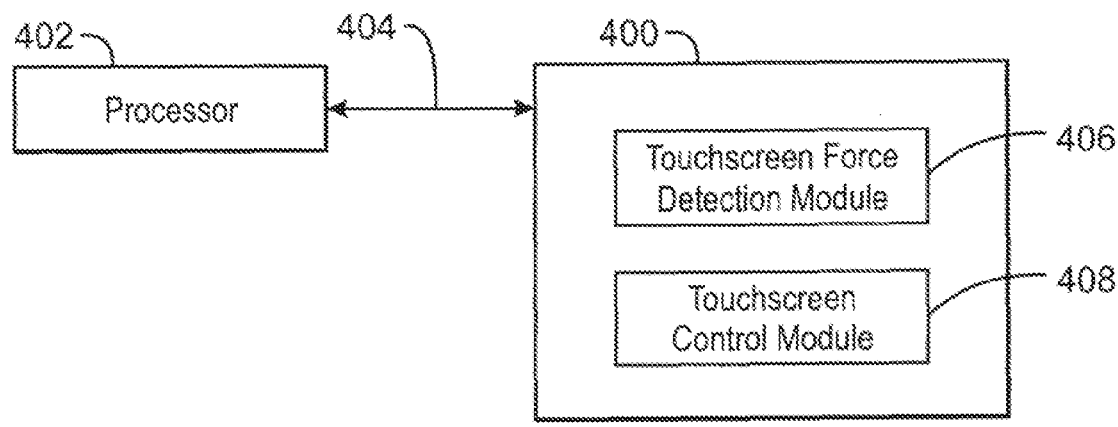
FIG. 4 is a block diagram showing tangible, non-transitory computer-readable media that store code for controlling the functioning of a touchscreen using a number of force sensors, in accordance with embodiments.

FIG. 4 is a block diagram showing tangible, non-transitory computer-readable media 400 that store code for controlling the functioning of a touchscreen using a number of force sensors, in accordance with embodiments. The tangible, non-transitory computer-readable media 400 may be accessed by a processor 402 over a computer bus 404. Furthermore, the tangible, non-transitory computer-readable media 400 may include code configured to direct the processor 402 to perform the techniques described herein.

The various software components discussed herein may be stored on the tangible, non-transitory computer-readable media 400, as indicated in FIG. 4. For example, a touchscreen force detection module 406 may be configured to detect a force applied to a touchscreen via one or more sensors. In some embodiments, the touchscreen force detection module 406 may also be configured to determine whether the applied force exceeds a threshold, as well as the point on the touchscreen at which the force was applied, for example. In addition, a touchscreen control module 408 may be configured to control the functioning of the touchscreen in response to the applied force detected by the touchscreen force detection module 406. In some embodiments, the touchscreen control module 408 controls the touchscreen based on whether the applied force exceeds the threshold and/or the point on the touchscreen at which the force was applied.

The block diagram of FIG. 4 is not intended to indicate that the tangible, non-transitory computer-readable media 400 are to include all of the components shown in FIG. 4. Further, the tangible, non-transitory computer-readable media 400 may include any number of additional components not shown in FIG. 4, depending on the details of the specific implementation.

EXAMPLE 1

A computing device is described herein. The computing device includes a touchscreen having one or more force sensors. The computing device also includes first logic to detect a force applied to the touchscreen via the one or more force sensors and second logic to control a functioning of the touchscreen in response to the applied force.

In some embodiments, the second logic is to determine whether the applied force exceeds a threshold and control the functioning of the touchscreen if the applied force exceeds the threshold. In some embodiments, the second logic is to activate the touchscreen from a deactivated mode in response to the applied force. Further, in some embodiments, the second logic is to activate the touchscreen from the deactivated mode if the applied force includes a continuous force applied to the touchscreen in a specified position.

In various embodiments, the one or more force sensors include a number of force sensors, and the second logic is to control the functioning of the touchscreen based on differences between an amount of force sensed by each force sensor. The number of force sensors may include a force sensor positioned at each corner of the touchscreen.

The computing device may also include logic to identify a position of the applied force and control an orientation of the touchscreen based on the position of the applied force. In some embodiments, the one or more force sensors include a number of force sensors, and the position of the applied force is identified based on differences between an amount of force sensed by each force sensor.

In some embodiments, the touchscreen includes a capacitive sensing capability, and the second logic is to control the functioning of the touchscreen by enabling the capacitive sensing capability of the touchscreen in response to the applied force. Further, in some embodiments, the computing device includes logic to detect a weight of an object positioned on the touchscreen using the one or more force sensors.

The computing device may include a mobile phone. In some embodiments, the computing device includes a touchscreen controller to implement the first logic and the second logic. In other embodiments, the computing device includes a processor to implement the first logic and the second logic.

EXAMPLE 2

A computing device is described herein. The computing device includes a touchscreen having one or more force sensors and a processor that is configured to execute stored instructions. The computing device also includes a storage device to stores instructions. The storage device includes processor executable code that, when executed by the processor, is configured to detect a force applied to the touchscreen via the one or more force sensors and control a functioning of the touchscreen in response to the applied force.

In some embodiments, the processor executable code is configured to determine whether the applied force exceeds a threshold and control the functioning of the touchscreen if the applied force exceeds the threshold. In addition, in some embodiments, the computing device includes a mobile phone.

In some embodiments, the processor executable code is configured to activate the touchscreen from a deactivated mode in response to the applied force. Furthermore, in some embodiments, the one or more force sensors include a number of force sensors, and the processor executable code is configured to identify a position of the applied force based on differences between an amount of force sensed by each force sensor and control an orientation of the touchscreen based on the position of the applied force.

EXAMPLE 3

At least one machine readable medium is described herein. The at least one machine readable medium includes instructions stored therein that, in response to being executed on a computing device, cause the computing device to detect a force applied to a touchscreen of the computing device via one or more force sensors for the touchscreen and control a functioning of the touchscreen in response to the applied force.

In some embodiments, the instructions cause the computing device to determine whether the applied force exceeds a threshold and control the functioning of the touchscreen if the applied force exceeds the threshold. In addition, in some embodiments, the instructions cause the computing device to activate the touchscreen from a deactivated mode in response to the applied force.

In some embodiments, the one or more force sensors include a number of force sensors, and the instructions cause the computing device to detect a position of the applied force based on differences between an amount of force sensed by each force sensor and control an orientation of the touchscreen based on the position of the applied force. In some embodiments, a force sensor is positioned at each corner of the touchscreen.

In some embodiments, the touchscreen includes a capacitive sensing capability. The one or more force sensors may be enabled and the capacitive sensing capability of the touchscreen may be disabled prior to detection of the applied force. The instructions may cause the computing device to enable the capacitive sensing capability of the touchscreen in response to the applied force. Further, in some embodiments, the instructions cause the computing device to detect a weight of an object positioned on the touchscreen using the one or more force sensors.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the embodiments are not limited to those diagrams or to corresponding descriptions herein. For example, flow need not move through each illustrated box or state or in exactly the same order as illustrated and described herein.

The present embodiments are not restricted to the particular details listed herein. Indeed, those skilled in the art having the benefit of this disclosure will appreciate that many other variations from the foregoing description and drawings may be made within the scope of the present embodiments. Accordingly, it is the following claims including any amendments thereto that define the scope of the embodiments.

What is claimed is:

1. A computing device, comprising:
   a touchscreen having a plurality of force sensors;
   first logic to detect a force applied to the touchscreen via the plurality of force sensors; and
   second logic to control a functioning of the touchscreen in response to the applied force, wherein the second logic is to control the functioning of the touchscreen based on a position of the applied force calculated from differences between an amount of force sensed by each of the plurality of force sensors, wherein the plurality of force sensors are enabled and a capacitive sensing capability of the touchscreen is disabled in a low power mode prior to detection of the applied force, and wherein the capacitive sensing capability of the touchscreen is enabled in response to the applied force.

2. The computing device of claim 1, wherein the second logic is to:
   determine whether the applied force exceeds a threshold; and
   control the functioning of the touchscreen if the applied force exceeds the threshold.

3. The computing device of claim 1, wherein the second logic is to activate the touchscreen from a deactivated mode in response to the applied force.

4. The method of claim 3, wherein the second logic is to activate the touchscreen from the deactivated mode if the applied force comprises a continuous force applied to the touchscreen in a specified position.

5. The computing device of claim 1, wherein the plurality of force sensors comprises a force sensor positioned at each corner of the touchscreen.

6. The computing device of claim 1, comprising logic to detect a weight of an object positioned on the touchscreen using the one or more force sensors.

7. The computing device of claim 1, wherein the computing device comprises a mobile phone.

8. The computing device of claim 1, comprising a touchscreen controller to implement the first logic and the second logic.

9. The computing device of claim 1, comprising a processor to implement the first logic and the second logic.

10. A computing device, comprising:
a touchscreen having one or more force sensors;
a processor that is configured to execute stored instructions; and
a storage device to stores instructions, the storage device comprising processor executable code that, when executed by the processor, is configured to:
detect a force applied to the touchscreen via a plurality of force sensors; and
control a functioning of the touchscreen in response to the applied force, wherein controlling the functioning of the touchscreen is based on a position of the applied force calculated from differences between an amount of force sensed by each of the plurality of force sensors, wherein the plurality of force sensors are enabled and a capacitive sensing capability of the touchscreen is disabled in a low power mode prior to detection of the applied force, and wherein the capacitive sensing capability of the touchscreen is enabled in response to the applied force.

11. The computing device of claim 10, wherein the processor executable code is configured to:
determine whether the applied force exceeds a threshold; and
control the functioning of the touchscreen if the applied force exceeds the threshold.

12. The computing device of claim 10, wherein the computing device comprises a mobile phone.

13. The computing device of claim 10, wherein the processor executable code is configured to activate the touchscreen from a deactivated mode in response to the applied force.

14. At least one non-transitory machine readable medium having instructions stored therein that, in response to being executed on a computing device, cause the computing device to:
detect a force applied to a touchscreen of the computing device via a plurality of force sensors for the touchscreen; and
control a functioning of the touchscreen in response to the applied force, wherein controlling the functioning of the touchscreen is based on a position of the applied force calculated from differences between an amount of force sensed by each of the plurality of force sensors, wherein the plurality of force sensors are enabled and a capacitive sensing capability of the touchscreen is disabled in a low power mode prior to detection of the applied force, and wherein the capacitive sensing capability of the touchscreen is enabled in response to the applied force.

15. The at least one non-transitory machine readable medium of claim 14, wherein the instructions cause the computing device to:
determine whether the applied force exceeds a threshold; and
control the functioning of the touchscreen if the applied force exceeds the threshold.

16. The at least one non-transitory machine readable medium of claim 14, wherein the instructions cause the computing device to activate the touchscreen from a deactivated mode in response to the applied force.

17. The at least one non-transitory machine readable medium of claim 14, wherein the plurality of force sensors comprises a force sensor positioned at each corner of the touchscreen.

18. The at least one non-transitory machine readable medium of claim 14, wherein the instructions cause the computing device to detect a weight of an object positioned on the touchscreen using the one or more force sensors.

* * * * *